May 28, 1940.     L. G. TORGERSON     2,202,408
STEEL TRAP
Filed Feb. 1, 1939
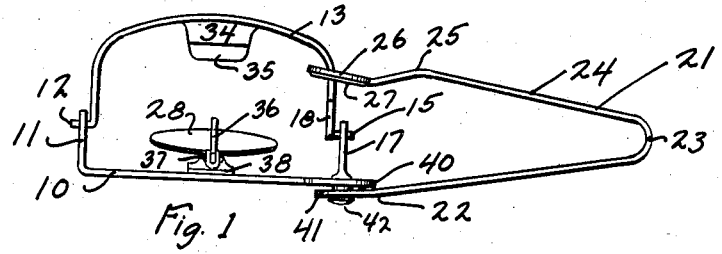
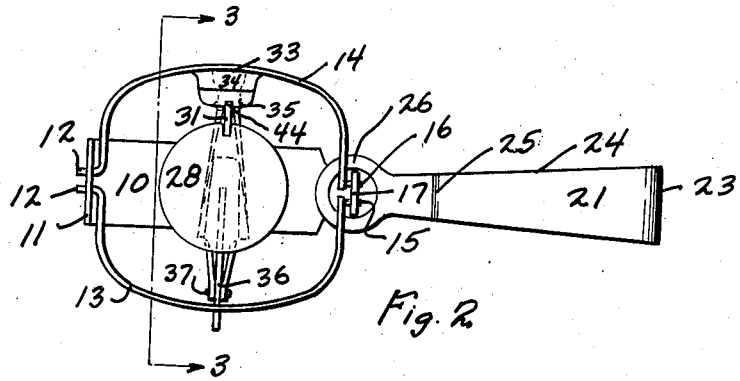
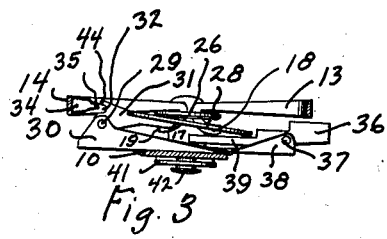 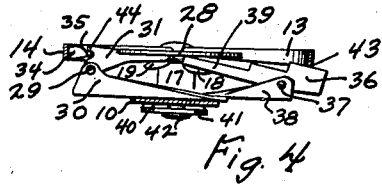
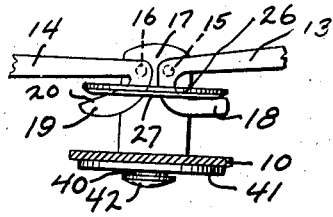
INVENTOR.
Leonard G. Torgerson
BY Sam J. Slotsky
ATTORNEY Patented May 28, 1940

2,202,408

UNITED STATES PATENT OFFICE 2,202,408

STEEL TRAP

Leonard G. Torgerson, Sioux City, Iowa

Application February 1, 1939, Serial No. 253,987

1 Claim. (Cl. 43—93)

My invention relates to a steel trap for catching animals.

An object of my invention is to provide improvements in steel traps so that the same can be set without danger of injury to the fingers.

A further object of my invention is to provide means for setting the trap exteriorly of the jaws and by the simple expedient of cooperating mechanism functioning together with the spring.

A further object of my invention is to provide the above mentioned objects in a simple construction which can be manufactured at a very reasonable cost.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1 is a side elevation of the trap,

Figure 2 is a plan view of the same in open position,

Figure 3 is a sectional view taken substantially along the line 3—3 of Figure 2, Figure 4 is a further sectional view taken along the same line, and Figure 5 is an enlarged detail.

I have used the character 10 to designate generally the base of the usual steel trap, the construction of which is well known in the art. The base 10 includes the outer upwardly extending flange 11 into which are pivoted the prongs of the jaws 13 and 14 at 12. The jaws 13 and 14 are of the usual collapsing type for trapping the animal. The jaws 13 and 14 are attached to the pins 15 and 16, which are received within the upstanding member 17 which is attached to the base 10, and at the other end thereof. The jaws 13 and 14 further terminate in the respective curved portions 18 and 19, shaped as shown clearly in Figure 5.

It will be noted that the extended and reverse portion 18 is made of uniform contour, while the portion 19 includes a sloping portion 20, the reason of which will be explained. The spring 21 is made of relatively strong material to provide the spring action and is bent at the point 22 and in the usual formation at 23, and then extends into the upper portion 24, which is bent downwardly at 25. The portion 25 terminates in the circular portion 26, which receives the vertical portions of the jaws 13 and 14 as shown. The member 26 also includes the beveled portion 27 therebeneath.

A bait-receiving treadle 28 is pivoted at 29 to the member 30, which is attached to the base 10. The treadle 28 terminates in the further portion 31, which includes a further recessed or indented portion 32. Rigidly attached at 33, to the upper portion of the jaw 14, is the extending lip 34, which extends into the smaller portion 35 at the end thereof.

A lever 36 is pivoted at 37 to the member 38, which is attached to the base 10. The lever 36 extends into the extended formation 39. A fairly substantial space is left at 40 between the end 41 of the spring 22 and the base to allow sufficient movement for spring action and the headed pin 42 is likewise attached to the base through the spring extremity 41 with sufficient clearance for necessary play.

Now that the structure of my device has been explained, I shall proceed to explain its operation. In setting the trap, all that is necessary is to firmly force the upper portion 24 of the spring downwardly toward the lower portion thereof. This action carries the member 26 downwardly causing the curved portion 27 to strike against the portions 18 and 19 which are integrally attached to the jaw portions 13 and 14. At first the portions 18 and 19 are in vertical position, but during such downward movement first the portion 26 will strike against the sloping portion 20 of the member 19 through the agency of the beveled portion 27. The jaw 14 is thereby swung downwardly to the true horizontal position before the jaw 13. By virtue of this action the jaw 14 will take the position as shown in Figure 3 with the lip 35 in position ready for engagement with the recessed portion 32 of the treadle member 31. During continued movement of the spring 24 downwardly, the portion 27 will continue to force the member 18 downwardly thereby carrying the jaw 14 to the directly horizontal position as shown in Figure 4. At this portion of the operation the jaw 13 abuts against the lever 36 at 43, thereby pivoting the same about the pivot 37 and forcing the portion 39 of the lever upwardly, which in turn forces the bait-receiving portion upwardly, and at the same time bringing the recessed portion into engagement with the lip 35. When the pressure is released from the spring 24, the upward pressure of the lip 35 against the portion 44 above the recessed portion 32 will hold the treadle in horizontal position as shown clearly in Figure 4. The trap is then ready for operation. The release of the treadle will then cause the lip 35 to be disengaged from the recessed portion 32 and the jaws will spring together in the usual manner. The bent formation of the spring at 22 and 25 permits the spring to occupy any position desired, and it will not be necessary for the spring to be in the position as shown in Figure 2, and can be angularly disposed relative to the member 17 since the formation of the spring will permit such relative movement.

It will now be seen that I have provided a steel trap which automatically sets for use without the necessity of inserting the fingers inside of the jaws, which permits setting exteriorly of the jaws by a simple operation. It will be seen furthermore that I have provided such a trap which can be built at a very reasonable cost.

Some changes may be made in the construction and arrangement of the parts of my invention without departing from the real spirit and purpose of my invention, and it is my intention to cover by my claim any modified forms of structure or use of mechanical equivalents, which may be reasonably included within their scope.

I claim as my invention:

A steel trap comprising a pair of U-shaped jaws, a spring member having an opening receiving ends of the jaws, said spring member forcing the jaws to closed position during upward movement, means coacting with the spring and the jaws to lock the jaws in open position when the spring member is forced downwardly, including integrally formed backwardly bent lips attached to the jaw ends, a bait-receiving treadle pivoted to the trap including a setting member having an indented portion, one of said jaws including an extended lip coacting with said portion, a lever member for raising said treadle pivoted to the trap, said lever member having an extended portion beyond the pivoting point thereof, the other of said jaws coacting with said extended portion to force the inner end of the lever and the treadle upwardly when the jaw is forced to horizontal position, the backwardly bent lip attached to the jaw including the extended lip, having a sloping portion for positioning the jaw in a directly horizontal position before the other of said jaws, to position the releasing lip before said treadle is raised to locking position.

LEONARD G. TORGERSON.